(12) United States Patent
Chaudhuri et al.

(10) Patent No.: US 12,335,057 B2
(45) Date of Patent: *Jun. 17, 2025

(54) CONFERENCING BETWEEN REMOTE PARTICIPANTS

(71) Applicants: Sandipan Subir Chaudhuri, Miami Beach, FL (US); Satrajit Chaudhuri, Miami Beach, FL (US)

(72) Inventors: Sandipan Subir Chaudhuri, Miami Beach, FL (US); Satrajit Chaudhuri, Miami Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/133,069

(22) Filed: Apr. 11, 2023

(65) Prior Publication Data

US 2024/0056323 A1 Feb. 15, 2024

Related U.S. Application Data

(63) Continuation of application No. 17/885,646, filed on Aug. 11, 2022, now Pat. No. 11,652,653.

(51) Int. Cl.
*H04L 12/18* (2006.01)
*H04N 23/90* (2023.01)

(52) U.S. Cl.
CPC ......... *H04L 12/1813* (2013.01); *H04N 23/90* (2023.01)

(58) Field of Classification Search
CPC .......... H04N 5/247; H04N 7/14; H04N 7/141; H04N 7/15; H04N 7/157; H04L 12/1813

USPC .............................................. 348/14.02–14.9
See application file for complete search history.

(56) References Cited

U.S. PATENT DOCUMENTS

| 9,241,111 | B1 * | 1/2016 | Baldwin | H04N 23/45 |
| 9,681,096 | B1 * | 6/2017 | Motta | H04N 7/142 |
| 10,404,938 | B1 * | 9/2019 | De Benoist | G06F 3/04817 |
| 2006/0244817 | A1 * | 11/2006 | Harville | H04N 7/15 348/E7.083 |
| 2009/0046075 | A1 * | 2/2009 | Kim | H04M 1/72403 345/173 |
| 2015/0085065 | A1 * | 3/2015 | Sun | H04N 7/142 348/14.08 |
| 2017/0111595 | A1 * | 4/2017 | Soni | H04L 65/403 |
| 2017/0244932 | A1 * | 8/2017 | Pistilli | G16H 40/67 |
| 2017/0270969 | A1 * | 9/2017 | Sanchez | H04N 23/51 |
| 2018/0063508 | A1 * | 3/2018 | Trail | G01S 17/89 |
| 2019/0260979 | A1 * | 8/2019 | Motta | H04N 7/147 |

* cited by examiner

*Primary Examiner* — Maria El-Zoobi
(74) *Attorney, Agent, or Firm* — Dykema Gossett PLLC

(57) ABSTRACT

Various embodiments of the present disclosure are directed to a video-conferencing system that is a realistic analog to an in-person meeting environment, and methods of communication using the video conferencing system. In one example embodiment, a video-conferencing system is disclosed including a semi-circular screen with a plurality of cameras embedded within the screen in a peripheral array. The camera array facilitating a unique field of vision for each participant of a user within the video-conferencing system associated with a respective position of each participant relative to the user in a meeting environment.

13 Claims, 7 Drawing Sheets

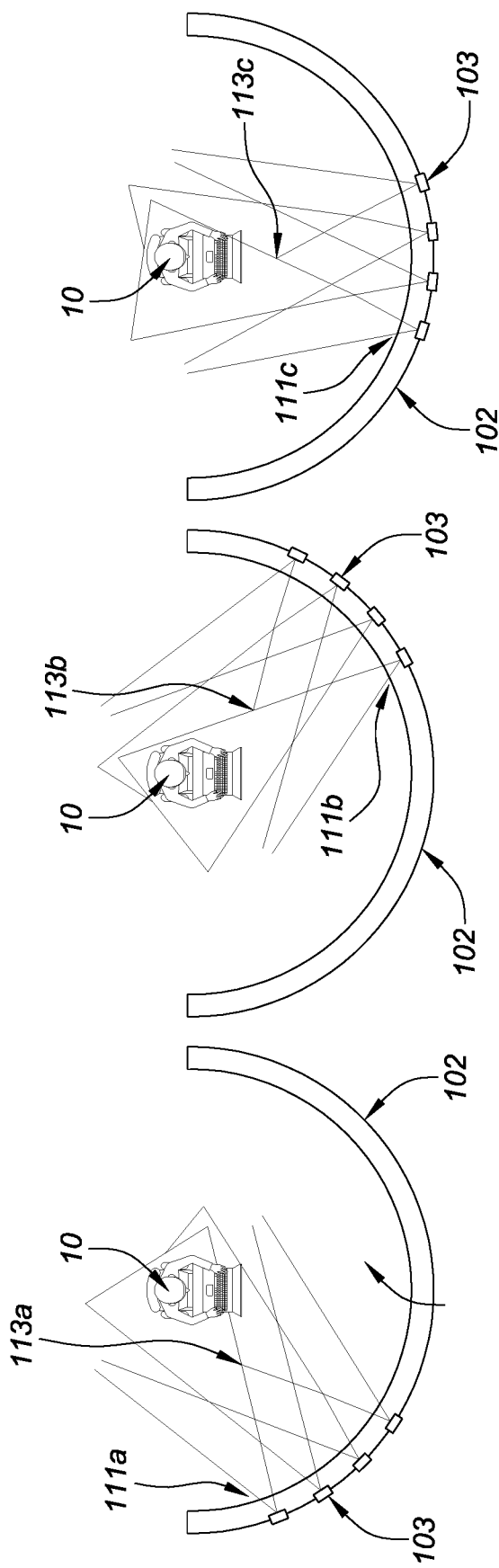

CONFERENCING BETWEEN REMOTE PARTICIPANTS

CROSS-REFERENCE TO RELATED APPLICATION

This application is a continuation-in-part of U.S. application Ser. No. 17/885,646, filed 11 Aug. 2023, now U.S. Pat. No. 11,652,653, which is hereby incorporated by reference as though fully set forth herein.

FIELD OF THE INVENTION

Various aspects of the present invention relate to the field of remote communications; more particularly, to systems and methods for providing a virtual environment associated with a video communication meeting between remote participants, such as videoconferencing.

BACKGROUND OF THE INVENTION

Communications between remote participants at different locations have long been facilitated through developments in video and audio conferencing applications and systems. Demand for video-conferencing systems have increased in light of the COVID-19 pandemic and the gradual shift toward remote working environments. Many conference systems allow for video and audio communications between participants such that a participant at one location can see and hear other participants with minimal delay.

Existing video-conferencing platforms and associated software applications are unable to provide a realistic analog to an in-person meeting environment. Some existing solutions utilize virtual reality headsets to enhance the visual experience, but are still unable to provide the realistic analog desired by remote video conference participants.

It has been suggested that body language may account for between 60 to 65% of all communication. See Foley G N, Gentile J P. Nonverbal communication in psychotherapy. Psychiatry (Edgmont). 2010; 7(6):38-44, at www.ncbi.nlm.nih.gov/pmc/articles/PMC2898840/. The ability to detect and view nonverbal indicators is largely tied to the extent that the communication experience closely mimics a real-life conference environment.

The foregoing discussion is intended only to illustrate the present field and should not be taken as a disavowal of claim scope.

SUMMARY OF THE INVENTION

Various embodiments of the present disclosure are directed to a video-conferencing system that is a realistic analog to an in-person meeting environment, and methods of remote communication using such a video conferencing system and apparatus.

These and other aspects and advantages of the present invention will become apparent from the subsequent detailed description and the appended claims. It is to be understood that one, some, or all of the properties of the various embodiments described herein may be combined to form other embodiments of the present invention.

DESCRIPTION OF THE DRAWINGS

Various example embodiments may be more completely understood in consideration of the following detailed description in connection with the accompanying drawings, in which:

FIG. 7A is a top view of a video-conferencing system illustrating section and position markers that delineate a viewable area of a first participant in the video-conferencing system to a second participant, consistent with various embodiments of the present disclosure;

FIG. 7B is a top view of a video-conferencing system illustrating section and position markers that delineate a viewable area of the first participant in the video-conferencing system to a third participant, consistent with various embodiments of the present disclosure;

FIG. 7C is a top view of a video-conferencing system illustrating section and position markers that delineate a viewable area of the first participant in the video-conferencing system to a fourth participant, consistent with various embodiments of the present disclosure.

Figure 1:
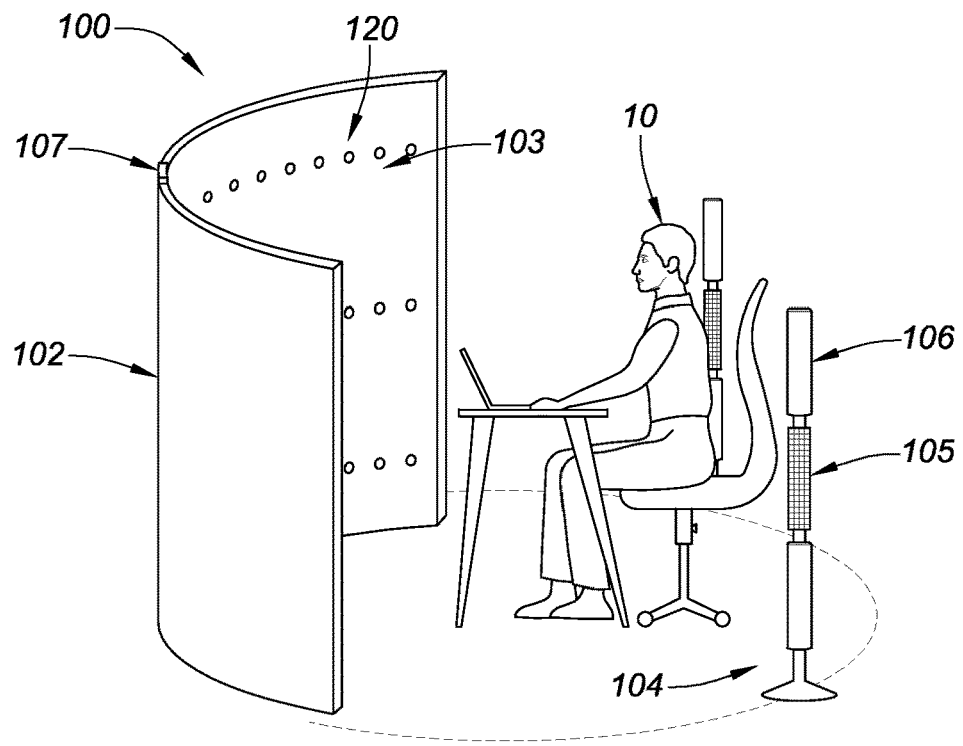
FIG. 1 is an raised side view of a video-conferencing system, consistent with various embodiments of the present disclosure.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION OF THE EMBODIMENTS

Various embodiments of the present disclosure are directed to video-conferencing systems and apparatus enabling a realistic analog to an in-person meeting environment, and methods of communication using the video conferencing system and apparatus.

Figure 2:
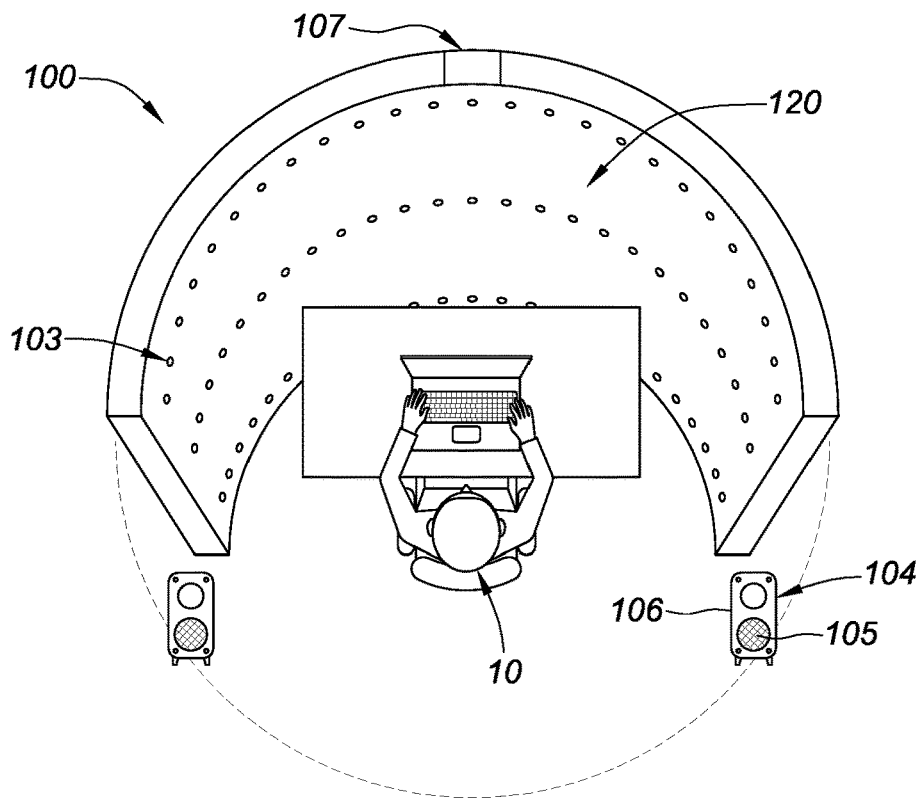
FIG. 2 is a top view of the video-conferencing system of FIG. 1, consistent with various embodiments of the present disclosure.

FIG. 1 is an isometric side view of a video-conferencing system 100 within a workspace 120 and FIG. 2 is a top view of the video-conferencing system 100. The system 100 includes a display 102, also referred to herein as a screen. As shown in FIGS. 1 and 2, screen 102 is a curved screen, and may be semi-circular in some embodiments. In the present embodiment, screen 102 extends approximately 180 degrees about a meeting participant 10. By largely encompassing the participant's field of vision with the screen 102, the resulting video-conferencing experience is greatly enhanced. In some embodiments, the screen 102 may extend less than, or more than, 180 degrees; for example, the screen may extend in a semi-circle between 120 and 240 degrees about the meeting participant.

As shown in FIGS. 1 and 2, display 102 includes a plurality of cameras either embedded in the display or positioned within small apertures extending through the display. In the present embodiment, the plurality of cameras 103 form an array extending in at least a horizontal direction with the cameras (equally) spaced circumferentially about the display 102. In some more specific embodiments the array of cameras 103 may extend vertically and horizontally about the display to facilitate users of varying heights and seating positions. In some embodiment, shutter speeds of the plurality of cameras 103 may vary in order to optimize image quality of a user when displayed by another participant's system 100. As discussed in more detail below, the array of cameras facilitate capturing video from a plurality of angles of the meeting participant. The system 100 associates these varying angles of the camera array with varying perspectives of other meeting participants within a virtual meeting room of meeting participant 10.

While the display 102 of FIG. 1 is depicted as being self-supporting and/or free-standing, in some further embodiments the display 102 may be built into a wall of an office or conference room, or may be suspended from or appended to any surface.

As further shown in FIG. 1, the video-conferencing system 100 may also include one or more towers 104, wherein the towers 104 may have one or more audio speakers or acoustic transducers 105 and/or light sources 106. The towers 104 may be communicatively coupled to controller circuitry of the video-conferencing system and/or the display 102 in a wired or wireless manner. These towers, as shown in FIG. 1, may be positioned behind or over the shoulder of the participant 10 to provide both back-lighting via light sources 106 and surround audio via speakers 105 (either alone or in combination with additional forward facing speakers within the display 102). Further, in some embodiments, a top surface of display 102 may include one or more additional lighting sources 107, as well as one or more speakers. When each participant of a meeting utilizes the video-conferencing system 100, the consistent lighting provided by light sources 106 and 107 of each system facilitates a realistic analog to an in-person meeting environment by ensuring similar lighting of each participant within the resulting virtual meeting environment. In some specific embodiments of the present disclosure, one or more speakers may be embedded within the display 102.

In yet other embodiments, each participant 10 of the system 100 may independently adjust the audio and lighting of their system as desired. For example, lighting 106/107 may be adjusted to compensate for low-lighting or over-saturation within workspace 120. Back-end processing circuitry for the virtual meeting environment may also control the lighting 106/107 of individual participants' systems 100 where video processing determines inconsistencies in lighting between the participants above a threshold which may negatively impact the immersive user experience.

Figure 3:
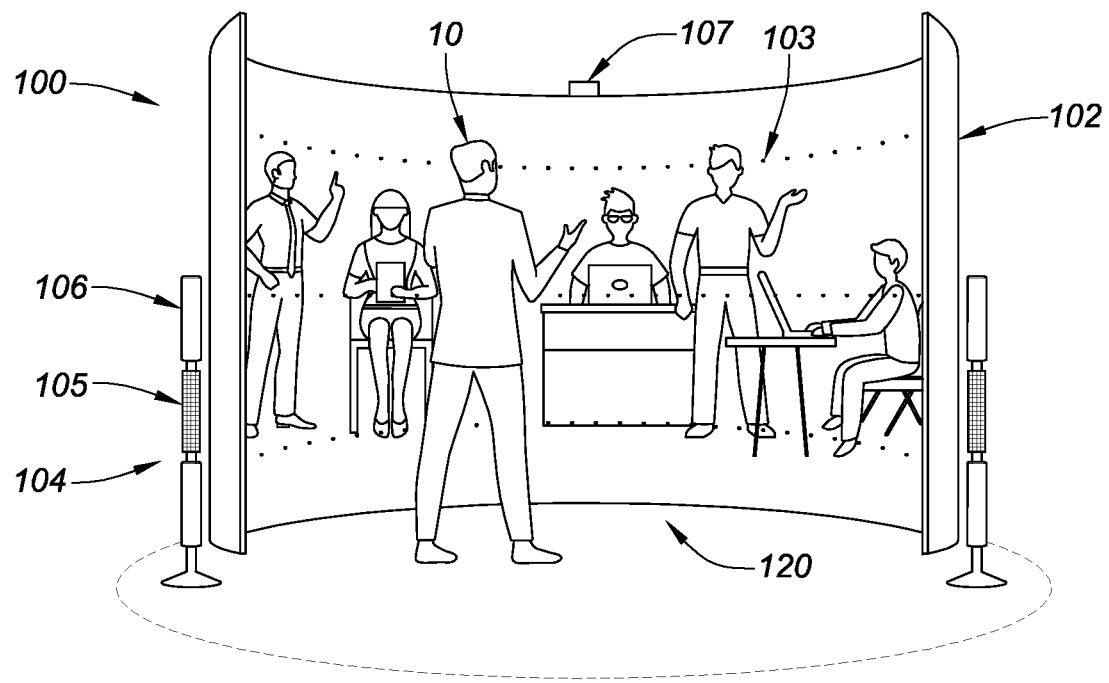
FIG. 3 is a front view of the video-conferencing system of FIG. 1 while in use, consistent with various embodiments of the present disclosure.
Figure 4:
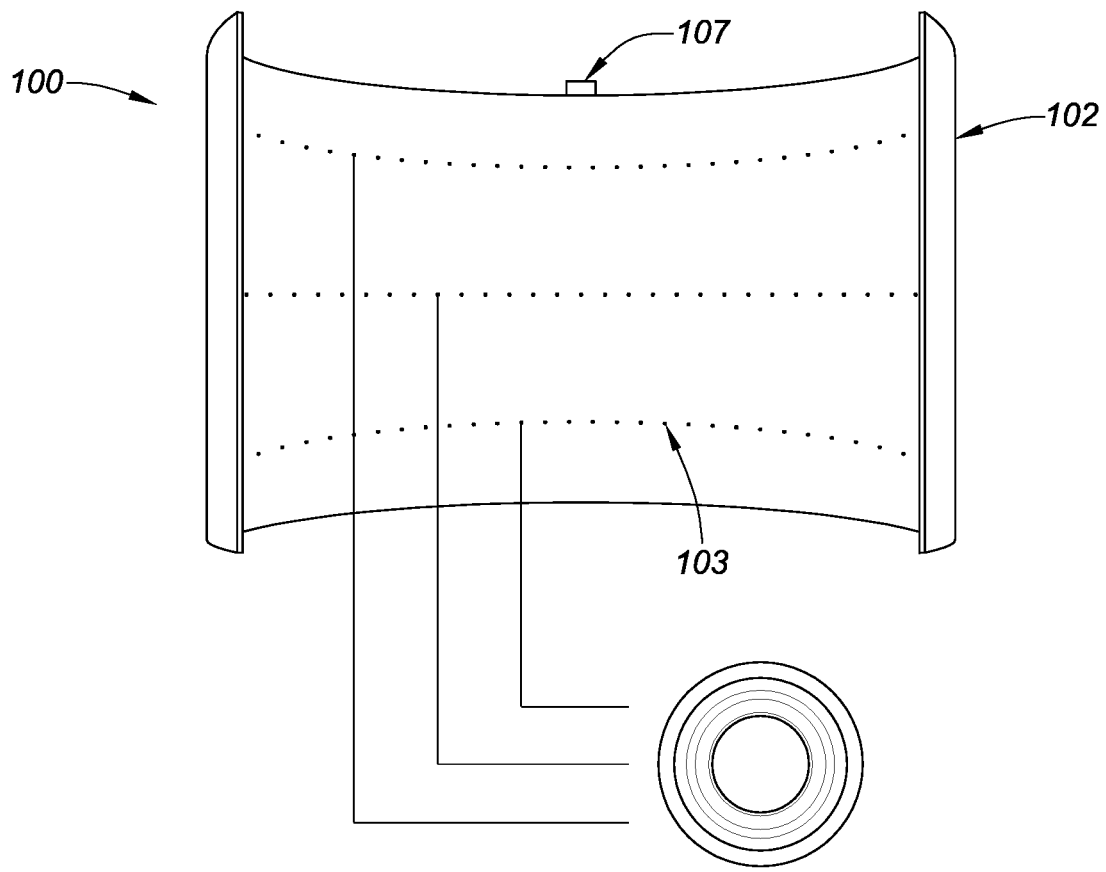
FIG. 4 is a front view of a video-conferencing screen, consistent with various embodiments of the present disclosure.

FIG. 3 is a front view of video-conferencing system 100 of FIG. 1 while in use, and FIG. 4 is a front view of a video-conferencing screen 102, consistent with various embodiments of the present disclosure. As illustrated in FIGS. 3 and 4, screen 102 may have a variable curvature such that screen 102 may largely encircle or surround participant 10, or screen 102 may be planar. In various embodiments of the present disclosure, screen 102 may include a support structure so that it is self-supporting and provide a rigid curved shape. In alternative embodiments, the screen 102 may be supported using various means, such as a mount, a stand, shelving, tripod, hung from a ceiling, or other support means. The dimensions of screen 102 for a video-conferencing system 100 may vary based upon user preference, or physical size limitations for a given installation space (e.g., size of a workspace 120). In some specific embodiments, screen 102 may have a height of six feet. In some embodiments, the radius of the curve, the height, the angle of the semi-circle and/or the length may be adjustable.

In FIG. 3, screen 102 is displaying a virtual environment including a composite of other meeting participants. In some more specific implementations of the present disclosure, the virtual environment may be further augmented by a shared virtual workspace (e.g., desk or conference table surface) on which participants may introduce content and manipulate it in real-time. Screen 102 may also include one or more lighting sources 107.

As shown in FIG. 3, a single front-facing light source 107 is positioned centrally at the top of the display 102; however, in other embodiments a plurality of light sources may extend across a length of the display (on the top, sides, and/or bottom).

As discussed in reference to FIGS. 1 and 2, screen 102 may include one or more cameras 103 affixed to or embedded in screen 102. Screen 102 may have, for example, a 180 degree curvature and the cameras may form an array across the screen surface. Cameras 103 are operable to capture a visual field of a participant so that the various fields of view of the participant may be utilized to replicate the participant 10 in a simulated environment—wherein the participant 10 is viewed as participating in a group with other participants. In preferred embodiments, cameras 103 of the system 100 are not visible to participant 10 when viewing the workspace 120 on the screen 102.

Each camera 103 is capable of generating a high resolution output, such as, for example, a 2K resolution output. The cameras 103 may be oriented at a fixed height, for example, at an approximate height of a participant's eyes when seated. Cameras 103 may also be height adjustable in response to a change in a participant's eye level (i.e., transitioning from seating to standing).

Where all participants of a video conference are not situated within a conforming video-conferencing system 100, in accordance with the present invention, a non-conforming participant's video-conferencing system will merely communicate a frontal view of the non-conforming participant for composition with the other conforming user's. However, the non-conforming user may still receive compositions from conforming user's indicative of a field-of-vision associated with the non-conforming user's assigned position relative to the conforming user within the virtual meeting space.

As shown in FIG. 4, the plurality of cameras 103 forming the camera array may be positioned in multiple rows and columns across the screen 102. Each camera of the array is independently addressable by controller circuitry to facilitate the transmission of one or more video streams of a local participant, for each remote participant, with a field of view uniquely associated with the relative positioning of the local participant to each remote participant within the virtual meeting room. In some specific embodiments, various characteristics of each of the cameras may be adjusted by controller circuitry (e.g., depth and exposure).

Various aspects of the present disclosure are directed to the display of remote participant video on a local participants screen 102 utilizing stereoscopic vision techniques to improve the visual perception of the remote conference participants to improve realism of the meeting environment (and as discussed in more detail in relation to FIGS. 7A to 7C). For example, cameras 103 may be placed adjacent to one another and separated by a distance, such as a distance of between 2 cm and 10 cm, or more preferably, between 6 and 7 cm, which is the approximate distance of separation between human eyes. The images from adjacent cameras 103, for the purpose of stereoscopic images, are processed by controller circuitry of the system 100 to generate a stereoscopic image which is then transmitted to and displayed on the screen 102 of remote participants.

The video-conferencing system 100, in various embodiments of the present disclosure, may edit the transmitted video to clip a portion of the viewable area based on a user's preference. The extent or depth of the viewable area of the video-conferencing system 100 can be adjusted to remove undesirable/distracting objects that may be in the environment such as furniture, decorative items, third-parties sharing a common work space, etc. In some preferred embodiments, the extent or depth of the viewable area of the video-conferencing system 100 may have a coverage of, for example, 100 square feet. As shown in FIG. 2, the 100 square feet area may be defined by a diameter of the screen 102 where an imaginary curve extends from the semi-circle of the screen 102 to fully enclose the user (and optionally the one or more towers). 106). The video-conferencing system 100 may implement augmented reality features to enhance the conferencing experience by enabling various visual, video, graphical, auditory, haptic, somatosensory and olfactory, or other digital, experiential, or sensory features that may be evident to conference participants.

In some specific embodiments, communicating with system 100 may require that the user wear a wearable communication aide, such as a head-mounted display (HMD), head-up display (HUD), microphone, or other wearable device during a communication session. In other embodiments, no wearable communication aide is required by the user when communicating by using system 100.

Figure 5:
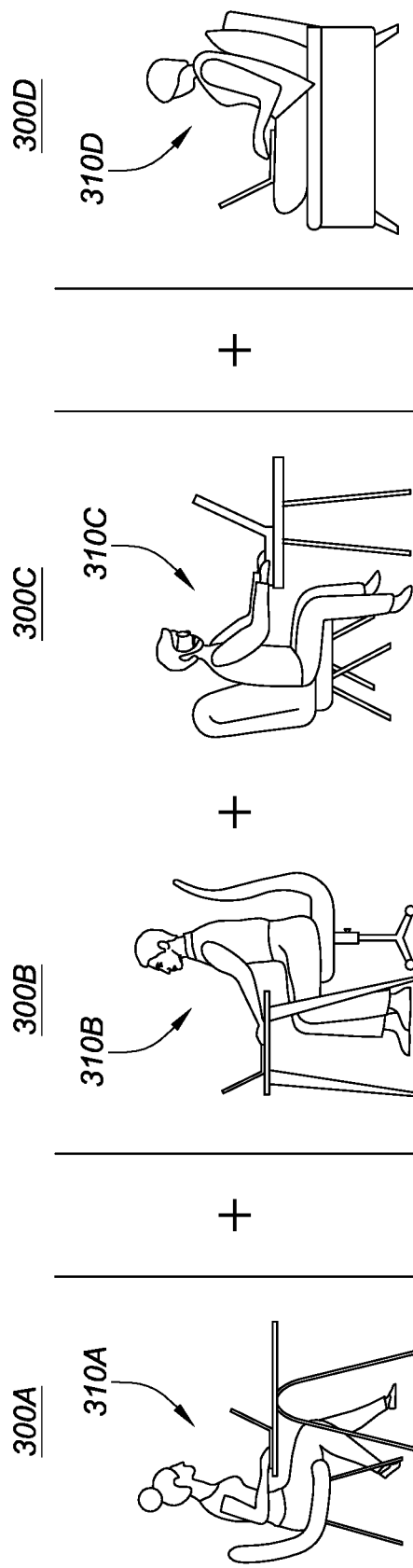
FIG. 5 illustrates four remote users participating in a video conference, consistent with various embodiments of the present disclosure.

FIG. 5 illustrates one example embodiment of a video-conferencing system, consistent with the present disclosure, which facilitates a virtual meeting of four participants 310A, 310B, 310C, 310D, all in respective remote locations using their own respective video-conference displays 300A, 300B, 300C, and 300D. The remote video-conferencing displays may be remotely networked to one another using a central server, or where one of the remote video-conferencing displays (and its associated controller circuitry) functions as the host of the conference and is a central point for receiving and transmitting video/audio date packets from/to the other remote participant's video-conferencing displays. While a video-conferencing system with four remote participants has been used as an example embodiment to illustrate the invention, it is to be understood that the number of participants and/or the number of remote video-conferencing displays is scalable as needed for given applications and conference sizes.

Figure 6A:
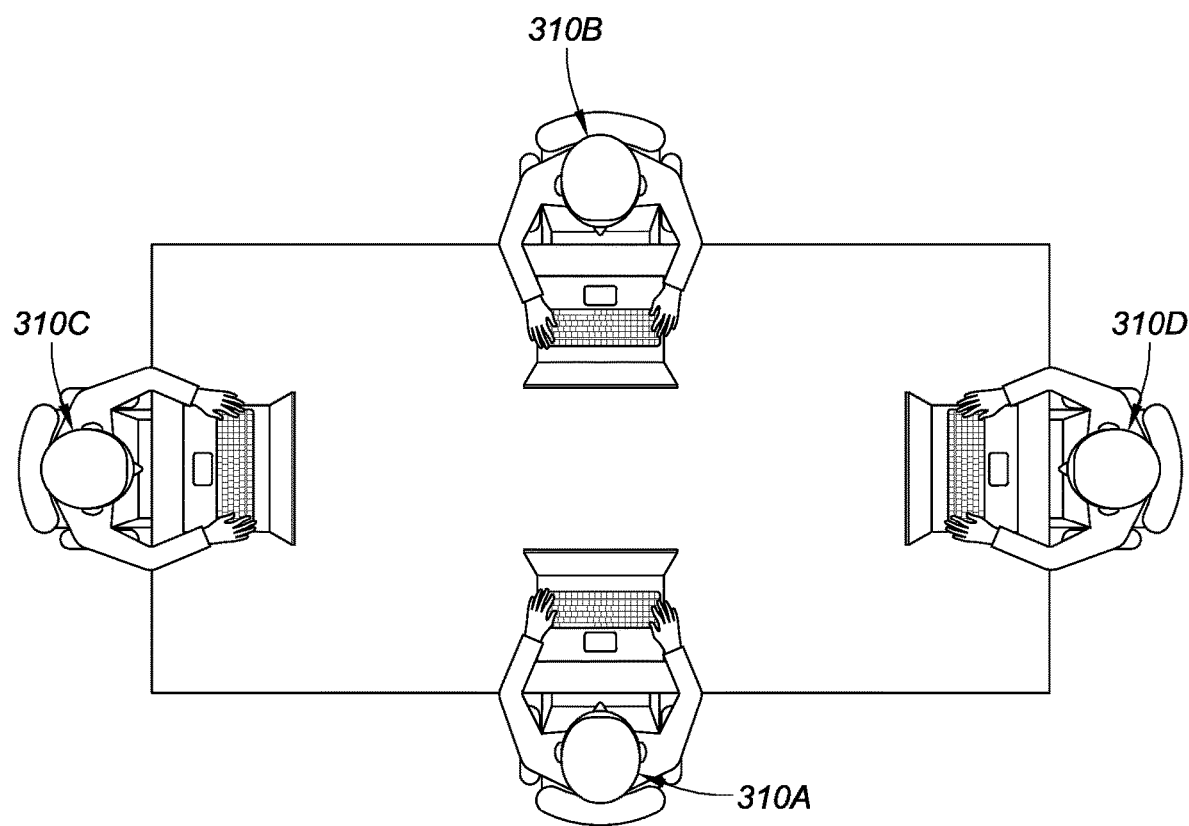
FIG. 6A illustrates an example top view of a virtual meeting environment of the video conference of FIG. 5, where each user is assigned a respective position within the environment, consistent with various embodiments of the present disclosure.
Figure 6B:
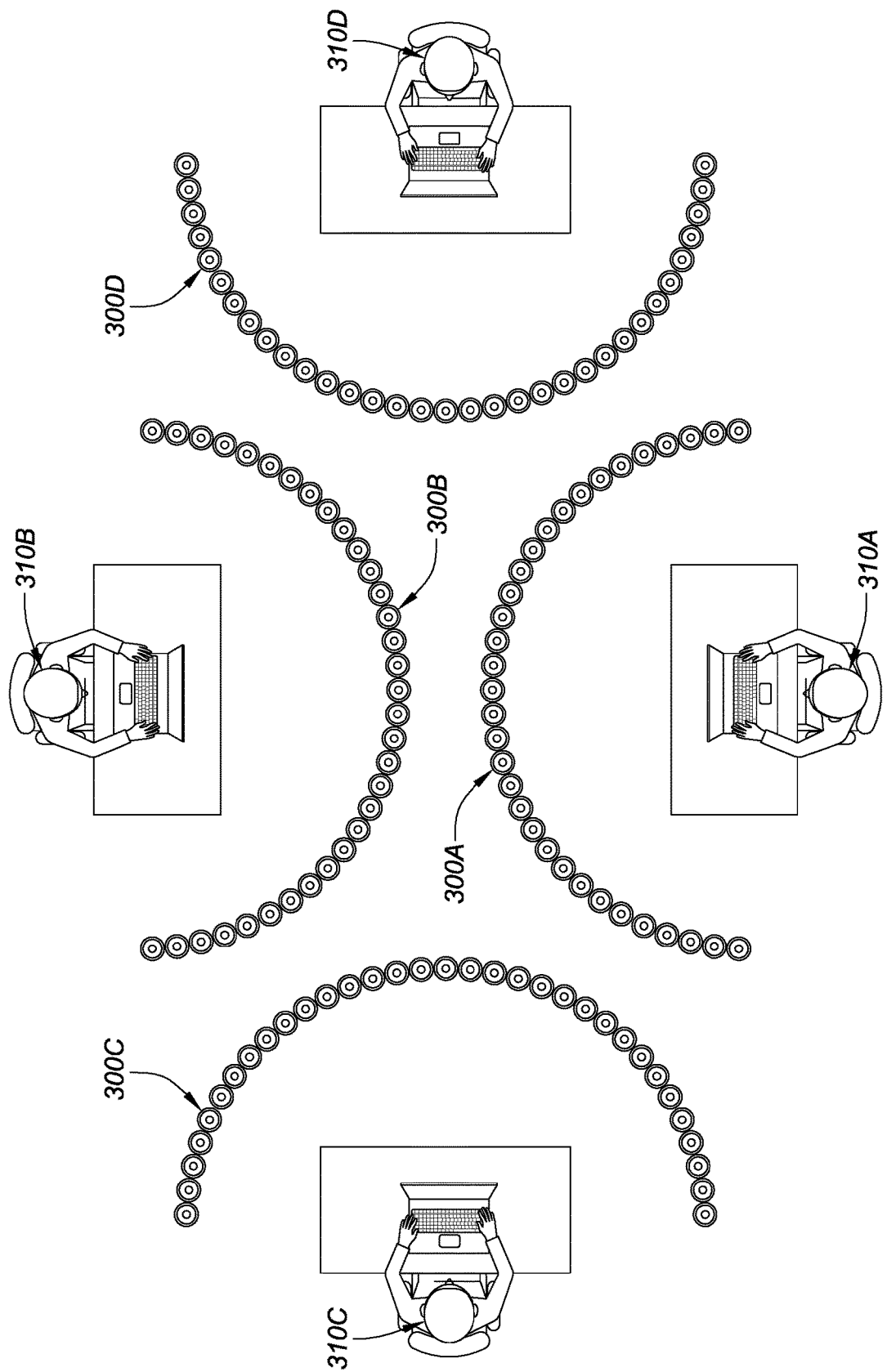
FIG. 6B illustrates an example top view of the possible setup for a virtual meeting of the video conference of FIG. 5, where each user is using a separate video-conferencing system, consistent with various embodiments of the present disclosure.

FIG. 6A illustrates a top view of the virtual meeting environment in FIG. 5 for the meeting of four participants 310A, 310B, 310C, and 310D. As shown in the virtual meeting environment illustrated in FIG. 6A, each participant is assigned a respective position within the virtual meeting environment. In the example embodiment illustrated, each participant is placed around a virtual conference table. Based on each participant's respective position to the other participants, and as shown by way of example in reference to FIGS. 7A-7C, the video-teleconferencing systems of each participant records and transmits video based upon these respective positional relationships within the virtual meeting environment. Although the participants 310A, 310B, 310C, and 310D perceive each other based on the respective positional relationships within the virtual meeting environment, FIG. 6B illustrates that participants 310A, 310B, 310C, and 310D are each respectively using video-conferencing systems 300A, 300B, 300C, and 300D for a virtual meeting of the video conference (as further depicted in FIG. 5).

As shown in FIGS. 7A, 7B, and 7C, screen 102 may be divided into multiple sections 111a, 111b, 111c. The sections 111a-c of screen 102 may be arranged tangentially and divided, for example, into multiple quadrants with a variable range, for example, of 120 degrees, which is the average range of the visual field of the human eye. See Hammoud, Riad—Passive Eye Monitoring: Algorithms, Applications and Experiments; Signals and Communication Technologies (2008). The range for the field of view of a participant 310A may be, for example, between about 60 to 120 degrees. As further shown in FIGS. 7A-7C, each of the one or more sections 111a, 111b, and 111c may define a respective position marker 113a, 113b, and 113c for how the various participants that communicate using the video-conferencing system view different perspectives of a participant 310A and the interactive communication environment on screen 102 and of workspace 120 (as shown in FIG. 3).

Referring to FIGS. 1-3 and 7A-7C, system 100 may automatically assign a viewing position of a participant 10/310A in a conferencing session, such as by a default. In other embodiments, the assigned viewing position of the participant 10/310A may also be controlled by a designated host or an administrator. In still other embodiments, if the participant 10/310A joins a conferencing session, such as by logging in to system 100, the system 100 can assign each participant a position based up their respective login timestamp.

In FIGS. 7A-7C, each of the position markers 113A, 113B, or 113C, may be assigned sequentially based upon, for example, the order in which video conference participants arrive to the virtual meeting room, positions as selected by each participant, randomly selected by a server hosting the virtual meeting room, pre-programmable factors, or participant pre-sets. Each participant is able to view the other participants as if all participants are in the same generally proximate vicinity via a composite where the fields of view of each other participant varies to thereby facilitate improved realism of the virtual meeting.

Figure 8A:
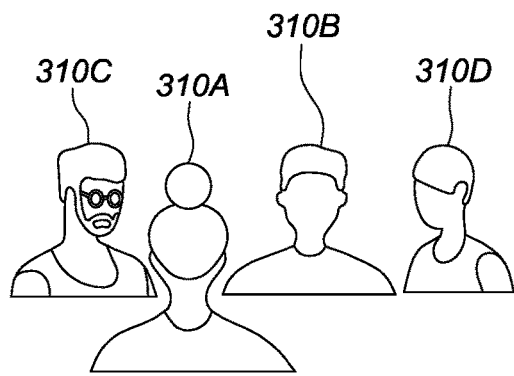
FIGS. 8A-8D illustrate the generated display for each user participating in a video conference, where each of the respective generated displays include a composite representation of the other remote users participating in the video conference based upon the respective positions of each user within the virtual meeting environment (see, e.g., FIG. 6A), consistent with various embodiments of the present disclosure.

FIGS. 7A, 7B, and 7C further illustrate how a video-conferencing system for a single participant 310A records and transmits fields of view to each of the other participants, three other participants in the present example embodiment, based upon the respective positions of participant 310A to the other users of the conference (as discussed further in reference to FIG. 6A). The video recorded from the video-conferencing system shown in FIG. 7C (a front-view of participant 310A) is transmitted to participant 310B, who is positioned directly in front of participant 310A in the virtual meeting environment of FIG. 6A. The video recorded from the video-conferencing system shown in FIG. 7B (a left perspective view of participant 310A) is transmitted to participant 310D who is positioned to the right of participant 310A in the virtual meeting environment of FIG. 6A. The video recorded from the video-conferencing system shown in FIG. 7A (a right perspective view of participant 310C) is transmitted to participant 310A who is positioned to the left of participant 310C in the virtual meeting environment of FIG. 6A. Similarly, video is recorded from each of the other participants 310B, 310C, 310D within their respective video-conferencing systems and transmitted to the other participants in accordance with their respective fields of view and positioning as illustrated in FIGS. 8A through 8D. In near real-time, each video-conferencing system receives video/audio data packets from the other networked video-conference systems and generates a composite video of the other participants for display to a local participant (as shown in FIG. 8A).

FIGS. 8A, 8B, 8C, and 8D illustrate a representative embodiment detailing how a group of participants 310A, 310B, 310C, and 310D may perceive each other using their own respective system 300A, 300B, 300C, and 300D based upon the relative positions assigned to each participant within a virtual meeting room (as shown in FIG. 6A, for example, and also explained in FIGS. 7A-7C).

By way of example, and as shown in FIG. 8A (with reference to FIG. 6A), the display of participant 310A presents a frontal view of participant 310B as participant 310B is positioned directly across from participant 310A in the virtual meeting environment of FIG. 6A. Participant 310C is positioned to the left of participant 310A and accordingly participant 310A receives a right-side view of participant 310C, which corresponds to the field-of-view that participant 310A would have of participant 310C were they actually in a meeting room together in the assigned positions of the virtual meeting environment. Similarly, as participant 310D is to the right of participant 310A, participant 310A receives video from participant 310D associated with a left-side view of participant 310D, which corresponds to the field-of-view that participant 310A would have of participant 310D were they actually in a meeting room together in the assigned positions of the virtual meeting environment.

Figure 8C:
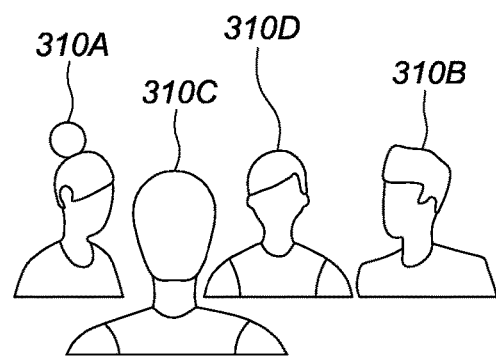
Figure 8B:
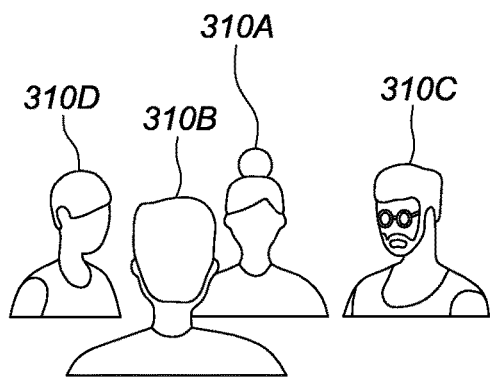

By way of further example, and as shown in FIG. 8B (with reference to FIG. 6A), the display of participant 310B presents a frontal view of participant 310A as participant 310A is positioned directly across from participant 310B in the virtual meeting environment of FIG. 6A. Participant 310D is positioned to the left of participant 310B and accordingly participant 310B receives a right-side view of participant 310D, which corresponds to the field-of-view that participant 310B would have of participant 310D were they actually in a meeting room together in the assigned positions of the virtual meeting environment. Similarly, as participant 310C is to the right of participant 310B, participant 310B receives video from participant 310C associated with a left-side view of participant 310C, which corresponds to the field-of-view that participant 310B would have of participant 310C were they actually in a meeting room together in the assigned positions of the virtual meeting environment.

By way of further example, and as shown in FIG. 8C (with reference to FIG. 6A), the display of participant 310C presents a frontal view of participant 310D as participant 310D is positioned directly across from participant 310C in the virtual meeting environment of FIG. 6A. Participant 310B is positioned to the left of participant 310C and accordingly participant 310C receives a right-side view of participant 310B, which corresponds to the field-of-view that participant 310C would have of participant 310B were they actually in a meeting room together in the assigned positions of the virtual meeting environment. Similarly, as participant 310A is to the right of participant 310C, participant 310C receives video from participant 310A associated with a left-side view of participant 310A, which corresponds to the field-of-view that participant 310C would have of participant 310A were they actually in a meeting room together in the assigned positions of the virtual meeting environment.

Figure 8D:
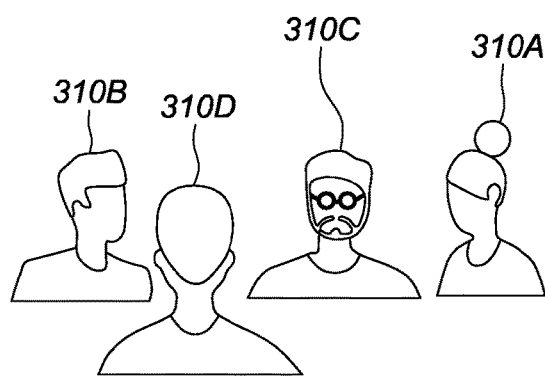

By way of further example, and as shown in FIG. 8D (with reference to FIG. 6A), the display of participant 310D presents a frontal view of participant 310C as participant 310C is positioned directly across from participant 310D in the virtual meeting environment of FIG. 6A. Participant 310A is positioned to the left of participant 310D and accordingly participant 310D receives a right-side view of participant 310A, which corresponds to the field-of-view that participant 310D would have of participant 310A were they actually in a meeting room together in the assigned positions of the virtual meeting environment. Similarly, as participant 310B is to the right of participant 310D, participant 310D receives video from participant 310B associated with a left-side view of participant 310B, which corresponds to the field-of-view that participant 310C would have of participant 310B were they actually in a meeting room together in the assigned positions of the virtual meeting environment.

As discussed in more detail above, the varying perspective views of participants 310A, 310B, 310C, and 310D are made possible by virtue of the respective position markers for the respective screens of video-conferencing systems 300A-D, and the positions marks of the screens for each of these respective systems may correspond to the position markers 113A-C as described in FIGS. 7A-7C.

One particular benefit of the present disclosure is that a participant utilizing a video-conferencing system as described may direct their gaze towards one of the other participants on their display and the respective fields-of-view recorded and transmitted to each of the other participants makes it clear which participant the gaze is directed to. In practice this greatly improves the realism of the user experience as a participant may, for example, look at one of the other participants' on their display and ask a question. Based on the unique fields-of-view recorded and transmitted to the other participants, it is clear to the other participants to whom the question was directed.

Participants using the video conferencing system 100 disclosed herein may view other conference participants in various ways, such as for example, the entire body of other participants. System 100 is capable of capturing the full range of view of any participant such that the full body of a participant may be viewable by other participants in the conference. This feature of system 100 is capable of allowing other participants to view and detect the body language and other visual or non-verbal communication cues of participants in the conference as if the participants are in the same room.

In some specific embodiments of the present disclosure, the system 100 may be utilized for non-video-conferencing applications such as video gaming—where the system 100 facilitates a truly immersive gaming environment.

In various embodiments of the present application, the video-conferencing system 100 may further facilitate real-time file sharing, document review, and editing of presentation, word processing files, spreadsheets, databases, and the like. In yet more specific embodiments, the system 100 provides a menu for various functionalities, including document viewing, editing, and file sorting.

Although several embodiments have been described above with a certain degree of particularity, those skilled in the art could make numerous alterations to the disclosed embodiments without departing from the spirit of the present disclosure. It is intended that all matter contained in the above description or shown in the accompanying drawings shall be interpreted as illustrative only and not limiting. Changes in detail or structure may be made without departing from the present teachings. The foregoing description and following claims are intended to cover all such modifications and variations.

Various embodiments are described herein of various apparatuses, systems, and methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," "an embodiment," or the like, means that a particular feature, structure, or characteristic described in connection with the embodiment is included in at least one embodiment. Thus, appearances of the phrases "in various embodiments," "in some embodiments," "in one embodiment," "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation.

It will be appreciated that for conciseness and clarity, spatial terms such as "vertical," "horizontal," "up," and "down" may be used herein with respect to the illustrated embodiments. However, many orientations and positions may be possible, and these terms are not intended to be limiting and absolute.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The following terms are to be interpreted according to the following definitions in the description of the invention that follows: The use of the term "not" in description of a value or parameter generally means and describes "other than" a value or parameter. The singular forms "a," "or," and "the" include plural referents unless the context clearly dictates otherwise. The terms "having" and "including" and similar terms as used in the foregoing specification are used in the sense of "optional" or "may include" and not as "required".

What is claimed is:

1. A video conferencing system comprising:
   a semi-circular screen configured and arranged to display a virtual workspace including remote participants and to extend at least partly around a local participant;
   an array of cameras configured and arranged to record video of a local participant, each of the cameras having a unique field-of-view of the local participant; and
   controller circuitry configured and arranged to
   assign positions to each of the remote participants and the local participant within a virtual meeting space,
   receive the recorded video of the local participant from the cameras within the array, wherein the cameras are adjacent with respect to one another and have an overlapping field-of-view with respect to the local participant,
   generate a stereoscopic video from the recorded video,
   transmit to each of the remote participants the stereoscopic video of the local participant associated with the unique field-of-view of each of the respective remote participants relative to the local participant,
   receive remote participant video from each of the respective remote participants, where the remote participant video received from each remote participant is recorded from a unique field-of-view associated with the local participant relative to each of the remote participants, and
   generate a composite representation of the remote participant videos for display within the virtual workspace where each of the remote participants appear with orientations relative to the local participant based upon their assigned positions in the virtual meeting space.

2. The video-conferencing system of claim 1, wherein the controller circuitry is further configured and arranged to receive video from two adjacent cameras of the camera array, generate a stereoscopic video, and transmit the stereoscopic video to one of the remote participants associated with that remote participants unique shutter speed and overlapping field-of-view with respect to the local participant.

3. The video-conferencing system of claim 1, wherein the array of cameras are embedded with the semi-circular screen.

4. The video-conferencing system of claim 1, wherein the screen extends in a semi-circle between 120 and 240 degrees.

5. The video-conferencing system of claim 1, wherein the video-conferencing system further includes one or more towers including lighting fixtures and speakers, the lighting fixtures of the one or more towers configured and arranged to provide back-light to the local participant, and the speakers are configured and arranged to play audio recorded from remote video-conferencing systems of the remote participants.

6. The video-conferencing system of claim 1, wherein the screen further includes a plurality of lights affixed to a perimeter of the screen.

7. The video-conferencing system of claim 1, wherein the array of cameras are further configured and arranged to capture a local workspace of the local participant defined by a diameter of the screen.

8. The video-conferencing system of claim 7, wherein the local workspace is approximately 100 square feet.

9. The video-conferencing system of claim 1, wherein the controller circuitry is further configured and arranged to clip a portion of the viewable area of the recorded video of the local participant based on a user's preference.

10. The video-conferencing system of claim 1, wherein the controller circuitry is further configured and arranged to clip a portion of the viewable area of the recorded video outside an imaginary curve extending from the semi-circle of the screen.

11. The video-conferencing system of claim 1, wherein the array of cameras are further configured and arranged to record a field-of-view of the local participant that is approximately 120 degrees.

12. The video-conferencing system of claim 1, wherein the virtual workspace imitates a real-life environment.

13. The video-conferencing system of claim 12, wherein the real-life environment is a workspace of the local participant.

\* \* \* \* \*